(12) United States Patent
Parulski et al.

(10) Patent No.: US 7,170,552 B2
(45) Date of Patent: Jan. 30, 2007

(54) DIGITAL IMAGING SYSTEM AND FILE FORMAT FOR STORAGE AND SELECTIVE TRANSMISSION OF PROCESSED AND UNPROCESSED IMAGE DATA

(75) Inventors: Kenneth A. Parulski, Rochester, NY (US); J. Scott Houchin, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 684 days.

(21) Appl. No.: 10/394,598

(22) Filed: Mar. 21, 2003

(65) Prior Publication Data

US 2003/0179297 A1 Sep. 25, 2003

Related U.S. Application Data

(63) Continuation of application No. 09/048,622, filed on Mar. 26, 1998, now Pat. No. 6,567,119.

(51) Int. Cl.
*H04N 5/225* (2006.01)
(52) U.S. Cl. .................. 348/207.2; 348/231.2; 348/231.3
(58) Field of Classification Search ........... 348/273, 348/231.2, 231.6, 207.2, 231.3, 234
See application file for complete search history.

(56) References Cited

U.S. PATENT DOCUMENTS

| | | | | |
|---|---|---|---|---|
| 5,065,229 A | * | 11/1991 | Tsai et al. | 348/391.1 |
| 5,442,718 A | * | 8/1995 | Kobayashi et al. | 382/166 |
| 5,493,335 A | * | 2/1996 | Parulski et al. | 348/231.6 |
| 5,606,365 A | * | 2/1997 | Maurinus et al. | 348/222.1 |
| 6,037,950 A | * | 3/2000 | Meir et al. | 345/427 |
| 6,222,646 B1 | | 4/2001 | Maurinus et al. | |

* cited by examiner

*Primary Examiner*—Ngoc-Yen Vu
*Assistant Examiner*—Gary C. Vieaux
(74) *Attorney, Agent, or Firm*—David M. Woods; Pamela R. Crocker

(57) ABSTRACT

An electronic still imaging system employs an image sensor comprised of discrete light sensitive picture elements overlaid with a color filter array (CFA) pattern to produce color image data corresponding to the CFA pattern, an A/D converter for producing digital CFA image data from the color image data, and a memory for storing the digital CFA image data from the picture elements. A processor enables the processing of the digital CFA image data to produce finished image data, and the digital CFA image data and the finished image data are both stored together in an image file. This enables image processing from raw camera data to final output data to be completed in a single, integrated process to provide improved image quality when printing.

7 Claims, 5 Drawing Sheets

DIGITAL IMAGING SYSTEM AND FILE FORMAT FOR STORAGE AND SELECTIVE TRANSMISSION OF PROCESSED AND UNPROCESSED IMAGE DATA

CROSS-REFERENCE TO RELATED APPLICATION(S)

This is a continuation of application Ser. No. 09/048,622, filed Mar. 26, 1998, now U.S. Pat. No. 6,567,119.

FIELD OF THE INVENTION

The invention relates generally to the field of electronic photography, and in particular to an electronic imaging system of the type that generates a standard format file.

BACKGROUND OF THE INVENTION

A typical digital camera uses a single color image sensor to capture a representation of a scene, including a representation of the color in the scene. The colors are separated by a color filter array(CFA) that overlies the sensor and associates each image pixel with a particular color according to the particular color pattern of the CFA. For example, the Bayer CFA (described in U.S. Pat. No. 3,971,065) provides an RGB pattern with a checkerboard arrangement of green pixel sites. Therefore, the primary CFA image signal for each pixel relates to but one color, that is, to either red, green or blue (for a Bayer CFA). After the CFA image is captured, the remaining (missing) colors for each pixel site are interpolated for each pixel from, e.g., surrounding pixels, so that a full resolution interpolated record is generated for each image. Each pixel in the interpolated record therefore has a set of RGB values.

Digital cameras, such as the Kodak DC50 camera, store the compressed digital image data from a single-chip color sensor (approximately 750×500 pixels) on a removable memory card. The process used to convert the image to a standard file format, and to print and edit the standard format, is shown in FIG. 1. The CFA image is captured in a capture step 10 by the camera. When the camera or memory is connected to a host computer in a connect step 12, the images are downloaded from the camera or memory card in a downloading step 14, processed in a processing step 16 and stored in a standard file format, such as a FlashPix file format, in a file formatting step 18. In the processing step 16, the CFA images are CFA interpolated as they are imported, using known CFA interpolation, color correction, and sharpening techniques, in order to create a "finished" RGB image file having a standard size. The finished RGB image file thus contains the CFA interpolated image, which has the same number of total pixels as the original image (for example, approximately 750×500 pixels for the DC50 camera). Unlike the original image, however, the CFA interpolated image has complete RGB data for each pixel.

The advantage of using a standard file format is that it allows the image to be used by many different imaging-enabled programs supplied by many different companies. Many different file formats are known and useful with this invention, albeit the following description is mainly in terms of a FlashPix file. FIG. 2 is a simplified diagram showing the key information stored in a FlashPix file. The FlashPix image format (defined in FlashPix Format Specification, version 1.0.1, (Digital Imaging Group, Jul. 10, 1997)) has been developed to serve as both an "interchange" format between devices (e.g. cameras) and applications (e.g. computer picture editing packages), and as a "native" format for image editing that allows the images to be easily and rapidly edited. This is accomplished using a hierarchical, tiled image representation within a "structured storage" file. Referring to FIG. 2, a FlashPix file contains the complete image data 24 plus a hierarchy of several lower-resolution copies within the same file (one set of lower resolution image data 25 is shown in FIG. 2).

Images at each resolution also are divided into rectangular tiles (e.g., squares), which enable the application to minimize the amount of image data processed to access, display or print a portion of the scene content. FlashPix allows thumbnail image data 23 and optional "ancillary" property set data 21 and 22 to be stored in the same structured storage file, along with the image data. This ancillary data can include digital audio recordings and parameters such as the time and date the photo was taken, the camera zoom position and focus distance, the scene illumination level, camera calibration data, image copyright owner, etc. For further information about the FlashPix image format see the aforementioned FlashPix Format Specification, version 1.0.1, (Digital Imaging Group, Jul. 10, 1997), which is available on the Wide World Web at http://www.digitalimaging.org/go/flashpix, and is incorporated herein by reference.

The image processing used to "finish" the image prior to storing the finished data in the FlashPix file includes operations such as CFA interpolation, color correction, and image sharpening. The output images are normally stored in a standard color space, such as the sRGB space which is supported by the FlashPix image format. As a consequence of generating the image file, the original camera data is discarded (step 26). If an image is to be printed or transmitted in an application step 28, the standard file format is first edited in an editing step 27.

To create final printed images, the finished image file may be adjusted by the user via an image processing program, such as provided by a program like LivePixp™ by Live Picture, Inc., to create a final output image of the desired size, which may include only a "cropped", color adjusted portion of the image captured by the camera, or may, e.g., include multiple images in a "montage". More specifically, to provide the appropriately sized output image, the image processing program first crops the 750×500 RGB CFA interpolated image data, and then uses another interpolation algorithm in the editing step 27 to convert from the cropped version of the "finished" RGB image file to the final desired output image.

Note that this prior art approach uses two interpolation steps, one (step 16) to interpolate "missing" RGB data from the image sensor while maintaining the 750×500 pixel data array, and a second (step 27) to interpolate from the selected crop to the pixel data array that provides the desired output size. The user therefore selects the final print size (for example 8"×10"), and the image is interpolated up to produce an image data record of appropriate size for the printer. For example, if the output device printed at 200 pixels per inch, the image data would be interpolated to 1600×2000 pixels by the computer or the printer, (and optionally sharpened) to produce the desired image size. In addition, this known approach often uses two separate sharpening operations, one on the 750×500 pixel CFA interpolated image data following the CFA interpolation step 16, and a second one on the interpolated 1600×2000 pixel image data array just prior to printing.

The prior art approach has a number of problems. First, the process of converting the image from the CFA image data (which may for example produce 12 bit per color data)

to the 8 bit per color (24 bit per pixel) sRGB color space may limit the quality of certain images, by reducing the color gamut and dynamic range of the captured image. Second, the two interpolation steps (the CFA interpolation that produces a standard size image and the interpolation in the computer or printer that produces the desired print size) provide more interpolation artifacts than would be produced using a single interpolation step that interpolates from the sensor CFA data directly to the output image data sent to the printer. Finally, using two separate sharpening steps can also produce artifacts.

What is needed is a digital camera system that maintains the advantages of using a standard, "finished" image file format so that the images can be used by many applications, yet also enables image processing from raw camera data to final output data to be completed in a single, integrated process, to provide improved image quality when printing.

SUMMARY OF THE INVENTION

The present invention is directed to overcoming one or more of the problems set forth above. Briefly summarized, according to one aspect of the present invention, an electronic still imaging system employs an image sensor comprised of discrete light sensitive picture elements overlaid with a color filter array (CFA) pattern to produce color image data corresponding to the CFA pattern, an A/D converter for producing digital CFA image data from the color image data, and a memory for storing the digital CFA image data from the picture elements. A processor enables the processing of the digital CFA image data to produce finished image data, and the digital CFA image data and the finished image data are both stored together in an image file.

With regard to a specific embodiment, the "original" image data (which is optionally compressed using a numerically lossless or visually lossless technique) is stored in a digital image file on a digital memory and transferred to a host computer. On the host computer, the digital camera data is processed, and a "FlashPix" format image file (or some other "finished" file format) is created. The original camera image data is also stored within the FlashPix file, in an "extension". The extension also includes data that indicates whether the FlashPix image data has been modified, rather than simply adjusting the displayed FlashPix image using the "viewing parameters."

The advantage is that the FlashPix image file, which can be used/edited by any FlashPix enabled application software, just like a standard FlashPix file, can also be used for direct pixel processing in order to minimize interpolation and other processing artifacts. To create the final high quality hard copy image, the (possibly cropped portion of the) original pixel data from the extension is directly interpolated (and optionally sharpened) in a single step to create the properly sized and color corrected output image. If the printer is located remotely, only the original camera data contained in the FlashPix extension is transmitted to the remote printer, thus reducing the transmission time.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because digital cameras employing electronic sensors, and electronic processing and storage of the resultant image data, are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as described in the following materials, all such software implementation needed to practice the invention is conventional and within the ordinary skill in such arts.

Figure 3:
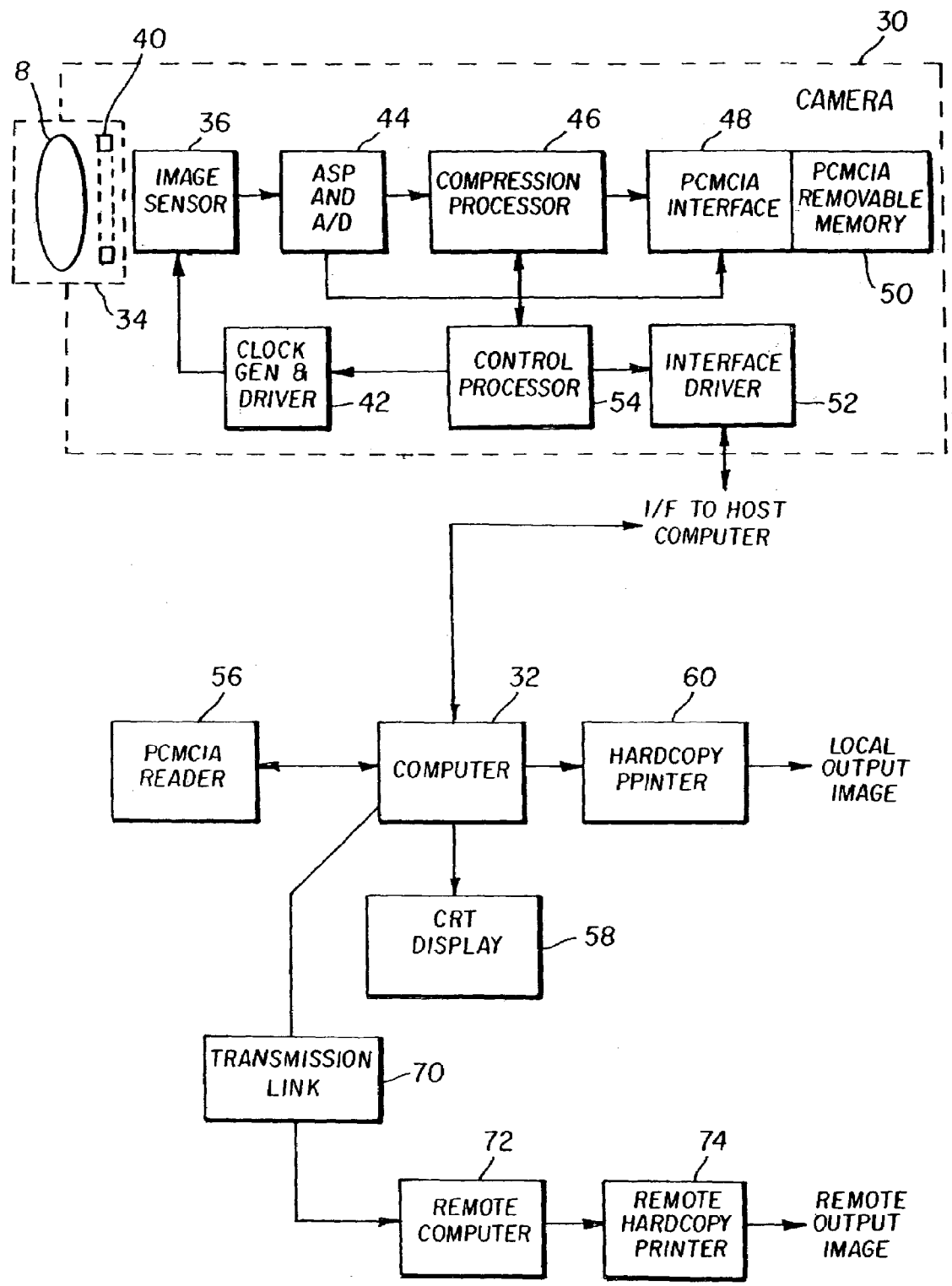
FIG. 3 is a block diagram of an electronic imaging system capable of storage and selective transmission of processed and unprocessed image data according to the invention.

Beginning with FIG. 3, a system block diagram shows a camera 30 and a host computer 32. The camera 30 includes an optical section 34 for directing image light upon an image sensor 36, typically a single image sensor such as a charge-coupled device (CCD). The image sensor 36 includes an array of discrete light sensitive picture elements, e.g., having 750×500 pixels, overlaid with a color filter array (CFA) pattern to produce color image data corresponding to the CFA pattern. The optical section includes a lens 38 and a shutter-aperture device 40 for regulating the exposure of the image light upon the image sensor 36. A clock generator and driver circuit 42 provides the waveforms necessary for generating the color image data from the image sensor 36, and the output data is applied to an analog signal processing (ASP) and a 12-bit analog/digital (A/D) conversion section 44, which produces digital CFA data from the color image data.

The resultant digital data is applied to a digital signal processor 46, which may compress the image data using, e.g., a numerically lossless or visually lossless compression technique employing, e.g., DPCM coding, and otherwise process the image data for storage. The processed digital CFA data is applied to a removable memory 50 via an output interface 48. In operation, the CFA image data represents an image of a fixed size, usually an image substantially corresponding to the actual size of the image sensor 36. Consequently, the memory 50 stores the digital CFA image data from a fixed number of picture elements corresponding to this fixed image size. Moreover, the digital CFA image data stored in the memory 50 may be contained within an image file that also describes the type of color filter array pattern used on the image sensor, as well as a low resolution thumbnail version of the captured image.

The output interface 48 is a memory card interface adapted to a conventional card interface standard, such as the PCMCIA card interface standard, such as described in the *PC Card Standard*, published by The Personal Computer Memory Card International Association, Sunnyvale, Calif., March 1997. The removable memory 50 accordingly is a non-volatile PCMCIA memory card containing either solid state memory, such as Flash EPROM memory, or a small hard drive (categorized as a PCMCIA-ATA Type III Hard Drive under the PCMCIA card interface standard). Another card interface standard is the CompactFlash ATA with DOS file format. Alternatively, other non-volatile storage devices may be used, such as a floppy disk magnetic medium or optical storage (in such cases, a suitable interface and a conventional read/write apparatus would be provided in the camera 30, e.g., a magnetic or optical read/write head).

In addition, the camera includes a host computer interface driver 52 for directly connecting the camera 30 to the host computer 32, for example, to download the digital CFA data corresponding to the captured images. (In this process, the removable memory 50 may serve as a buffer memory or a separate buffer memory (not shown) may be provided.) The camera 30 further includes a control processor 54 for controlling (a) the clock generator and driver circuit 42, (b) the digital signal processing chain comprising the ASP and A/D section 44, the digital signal processor 46 and the output interface 48, and (c) the interface driver 52. The interface driver 52 provides a conventional computer interface, such as a SCSI, IEEE-1394, or RS-232 interface. Consequently, the digital CFA data from the camera 30 interfaces with the host computer 32 either through the interface driver 52, or through a card reader 56 that receives the removable memory 50.

In order to produce an output image, the host computer 32 includes application programs for processing the captured images and producing a soft copy on a display 58 or a hard copy on a printer 60 (or, e.g., a film writer or the like). For example, the application program (not shown) includes an algorithm section, which applies direct pixel mapping/cropping concurrent with CFA interpolation. The computer additionally includes an user interface (not shown) that provides user operated means for cropping to an output image size that uses a subset of pixels from the fixed image size provided by the camera. The application program then interpolates full color data for each picture element of the output image from the cropped picture elements and produces an interpolated output image having the selected output image size. The host computer 32 may be further connected through a transmission link 70 (e.g., internet) to a remote computer 72 and a remote output device 74, such as a hard copy printer.

Figure 1:
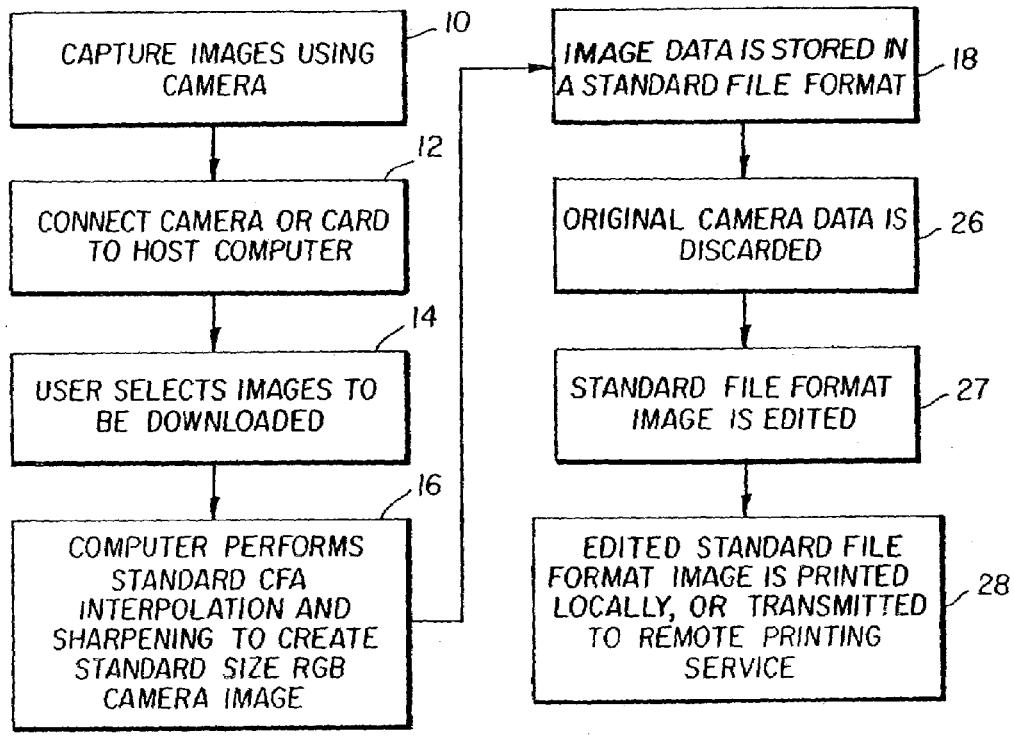
FIG. 1 is a flow diagram of a known technique for capturing and processing image data.
Figure 2:
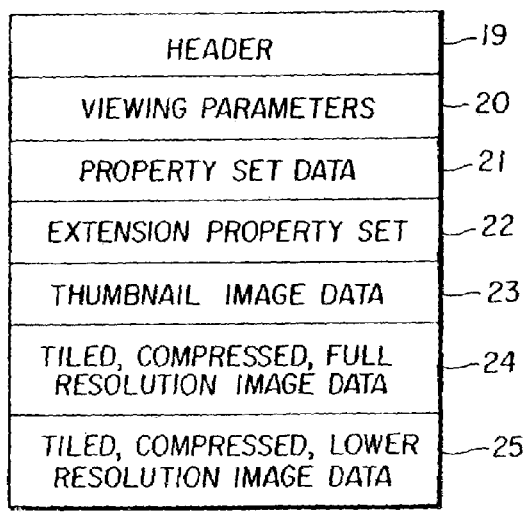
FIG. 2 is an illustration of the well known FlashPix file format.
Figure 4:
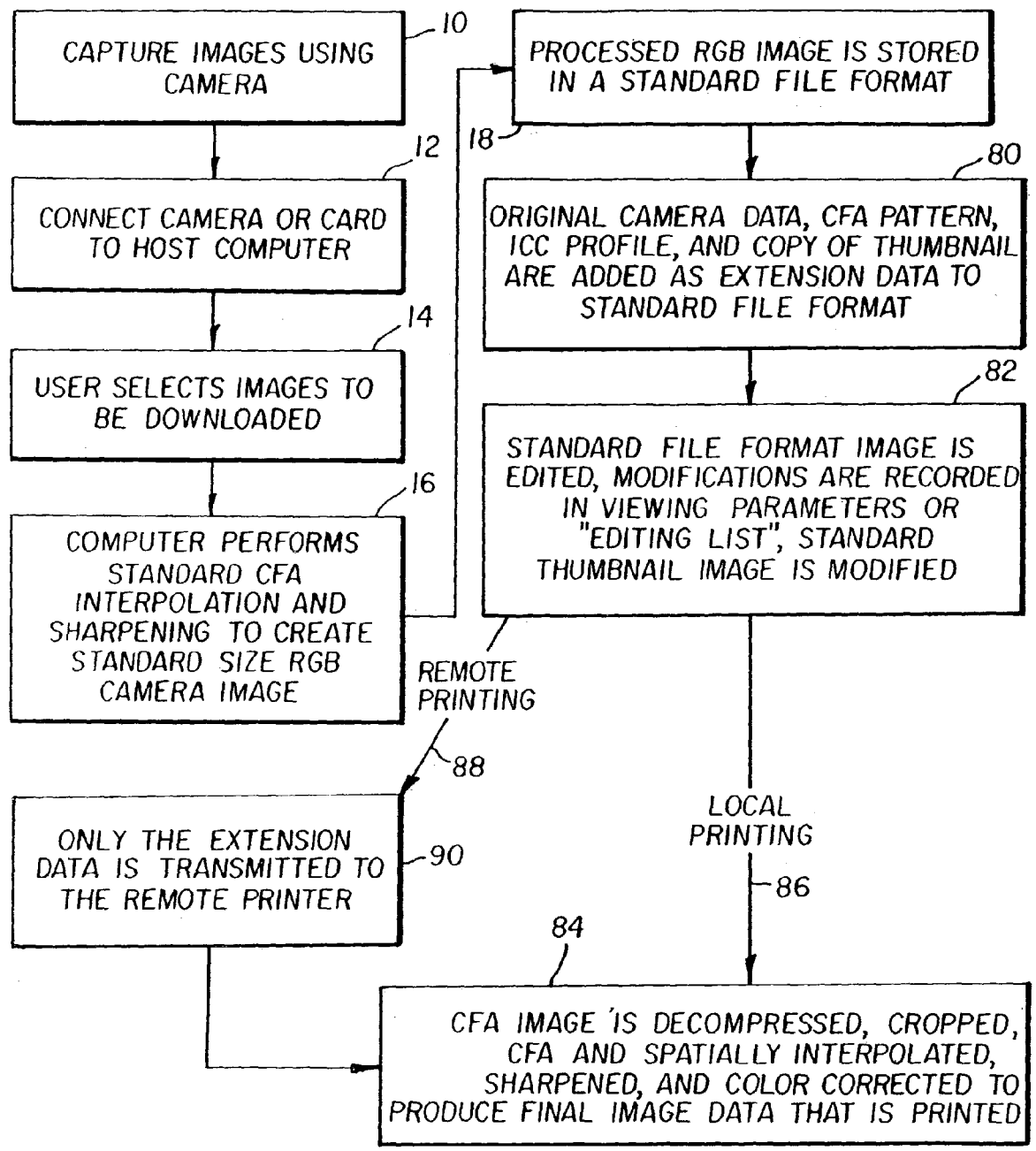
FIG. 4 is a flow diagram showing storage and selective transmission and processing of processed and unprocessed image data according to the invention.
Figure 5:
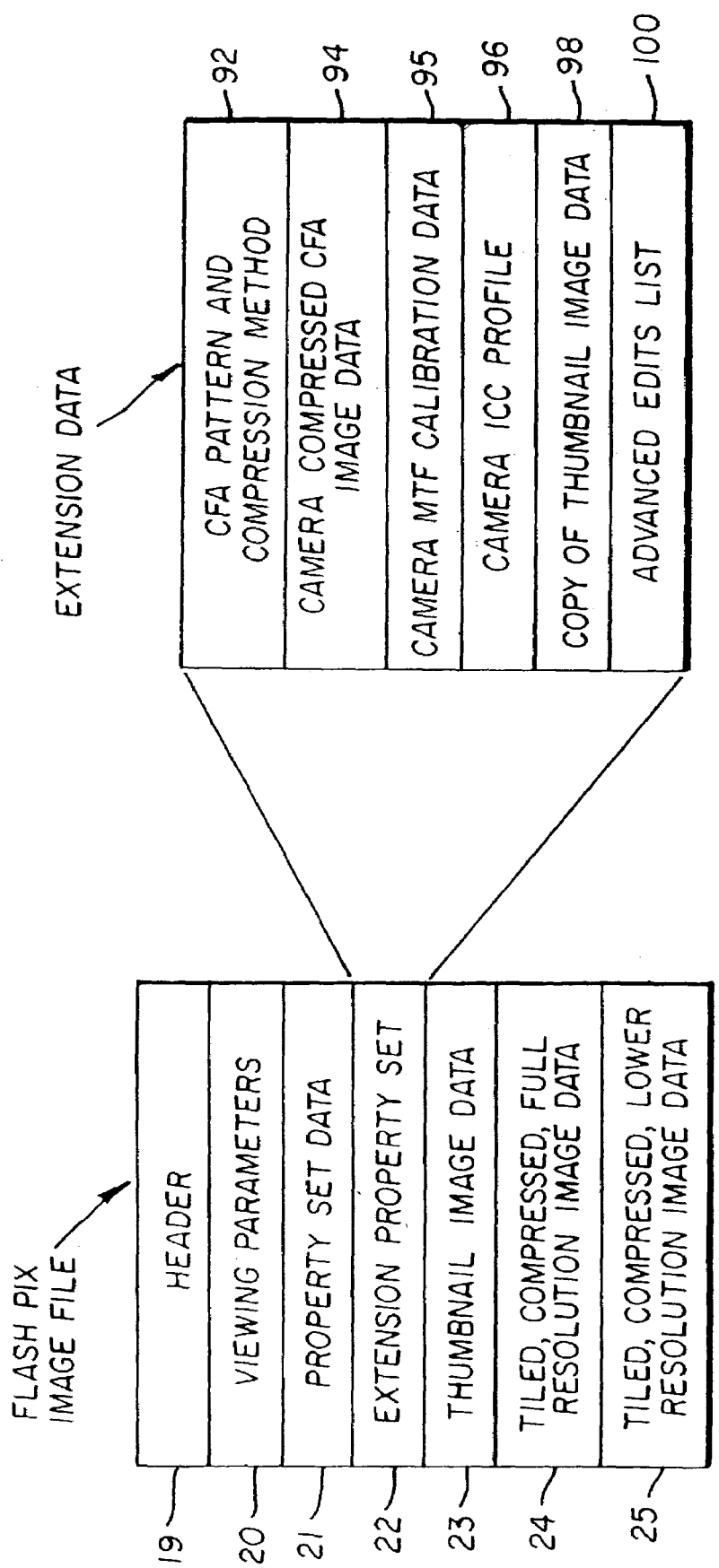
FIG. 5 is an illustration of a FlashPix file format incorporating extension data according to the invention.

Operation of the imaging system according to the invention is shown in the flow diagram of FIG. 4, and a representation of the image format used with this invention is shown in FIG. 5. As described in connection with FIG. 1, the user operates the camera to take pictures in the capture step 10, and then connects the camera or the card to the host computer in the connect step 12. The user selects the images(s) to be processed and converted to the finished file format, such as the FlashPix format, in the downloading step 14. To create the finished image data, the 750×500 Bayer pattern CFA image data from the camera is decompressed and interpolated as described in connection with the processing step 16 shown in FIG. 1, to produce CFA interpolated, color corrected, sRGB image data, which then can be stored during the file formatting step 18 in the tiled, hierarchical FlashPix file in the complete image field 24 and also in the lower resolution image field 25.

In accordance with the invention, a file format extension step 80 is provided in which the original 12-bit compressed CFA data is also stored within the same FlashPix file as the tiled image data, but in a CFA image data field 94 in the extension property set 22. More specifically (in reference to FIG. 5), the extension property set includes CFA pattern and compression method data 92, CFA image data 94, a camera ICC profile 96, thumbnail image data 98, and an advanced edits list 100. Accordingly, the extension data may include metadata that provides the CFA pattern used on the image sensor 36 and the compression method used by the digital signal processor 46, which is stored in the CFA pattern and compression method data 92. The camera MTF (modulation transfer function) values may be stored as a table in the MTF data 95. An ICC (International Color Consortium) profile, which characterizes the color of the CFA data stored in the extension property set 22, may be stored in the ICC profile 96. Note that this is a different ICC profile than the optional profile used within the FlashPix image file to describe the sRGB color data. In the standard usage of the FlashPix format, if the standard file format should be edited in an editing step 82, simple modifications (such as rotate, crop, and sharpen) do not modify the image data 24, 25. Rather, the list of modifications is recorded in the viewing parameters set 20, and the standard thumbnail data 23 is modified as well. More complex modifications, such as red-eye removal, require that portions of the image data be modified. To record these modifications, so that they can later be applied to the CFA image data 94, the metadata lists this editing data in the advanced edits list 100 to describe edits performed by an applications program other than modifying the standard FlashPix viewing parameters. In addition, the metadata may also include a copy of the unmodified thumbnail image in the thumbnail image data 98, which can be compared to the modified thumbnail image data 23 to determine if any changes have been made to the original image data by subsequent image editing applications.

As explained above, if an image file is modified by the application, for example, by cropping, or adjusting the color or brightness of the image, the CFA image data 94 may no longer properly represent the edited image. In the FlashPix image format, a mechanism is specified that enables an application to determine the validity of ancillary data (such as the CFA image data 94) stored in an extension property set within a FlashPix file. Such an extension set is further described in U.S. Pat. No. 5,983,229, entitled "Extension persistence mechanism for a digital image format" and assigned to the assignee of the present application. According to U.S. Pat. No. 5,983,229, the extensions contain a field for indicating an extension persistence property. The extension persistence property indicates the validity of the extension data as a function of whether or not the core elements of the file are modified. The values for the extension persistence property, and their corresponding meanings, are as follows:

| Value | Meaning |
|-------|---------|
| 0x0 | Extension is valid and remains in the file independent of modifications to the core elements of the file. |
| 0x1 | Extension is invalid upon any modification to the core elements of the file, and must be removed from the file when core elements are edited. |
| 0x2 | Extension is potentially invalid upon modification to the core elements of the file, and must remain in the file until an application that understands the extension can determine if the extension is valid (remains in the file) or invalid (removed from the file). |

The extension persistence value for the extension property set 22 according to the present invention is set as 0×2 to indicate that the extension data (such as the CFA image data 94) is potentially invalid upon modification to the core elements of the file. The extension property set 22 therefore remains in the FlashPix file until an application that understands the extension can determine if the extension is valid or invalid.

The FlashPix file containing this extension data can now be used by any FlashPix enabled application, including applications that do not understand the meaning of the data within extension property set 22. More specifically, referring to FIG. 4, the file containing the extension data may be transmitted to a printing stage (step 84) via a local linkage 86 or via a remote linkage 88, in which case the extension data may be separated from the file (step 90) and sent to the printing stage (step 84). The image may be changed in a number of ways, e.g., cropped, lightened, and processed for red-eye removal. In some cases, (e.g., cropping, lightening) these changes can be done by adjusting the viewing parameters 20 in the FlashPix file, rather than by modifying the image data 24, 25. In all cases, however, the applications program modifies the standard FlashPix thumbnail image data 23 to accurately reflect the image modifications.

When the image data is printed by an "old" printer that does not understand the meaning of the extension property set 22, the standard FlashPix image data is printed the same way as in the prior art. If the printing application understands the extension property set 22, however, it normally processes the CFA image data stored in the extension to provide the data to be printed. This is done as described in copending U.S. application Ser. No. 09/048,605. In this application, the "original" image data (which is optionally compressed using a numerically lossless or visually lossless technique) is stored in a digital image file on a digital memory and transferred to the host computer. This image file is retained until a final rendered image is created. A "soft copy" quality version of the image can be displayed to the user, who can decide to crop the image and to create an output image of any size to be printed, incorporated into other documents, etc. The advantage is this: To create the final high quality image, the cropped portion of the original pixel data is directly interpolated (and optionally sharpened) in a single stage to create the proper output image size. By directly mapping the input pixels to the desired output pixels in a single stage that includes CFA interpolation, interpolation artifacts are minimized. In addition, if the image is sharpened in this stage, the sharpness of the output image is improved without degradation from artifacts due to multiple sharpening stages.

Accordingly, the 750×500 Bayer pattern digital CFA image data from the camera is decompressed and cropped as specified by the user, for example a 256×256 square portion of the image may be used. The CFA interpolation and spatial processing are then combined in a single processing step, as shown in more detail in application Ser. No. 09/048,605, to produce the final output image data, which could be a larger square image, e.g., 1024×1024 pixel image. The CFA interpolation step may practice any of a number of known interpolation techniques. For instance the interpolation techniques in the following patents may be used: U.S. Pat. No. 5,373,322, entitled "Apparatus and method for adaptively interpolating a full color image utilizing chroma gradients"; U.S. Pat. No. 5,382,976, entitled "Apparatus and method for adaptively interpolating a full color image utilizing image gradients"; and U.S. Pat. Nos. 5,506,619 and 5,629,734, both entitled "Adaptive color plan interpolation in a single sensor color electronic camera". Each of these patents is incorporated herein by reference.

After the final size image record is interpolated, the image is sharpened in a single sharpening step. This sharpening may use the technique described in U.S. Pat. No. 5,696,850 entitled "Automatic image sharpening in an electronic imaging system" and incorporated herein by reference. This patent uses a modulation transfer function (MTF) calibration data 95 from the camera and the printer MTF data (not shown) to determine the appropriate sharpening filter for optimally sharpening digital reproductions of any size taken by an electronic camera. The image data is finally printed out in hardcopy form in the hardcopy printer 60 or in the remote printer 74 (FIG. 3).

To ensure that the image data in the file has not been altered by an image processing application (which, for example, might have implemented "red eye" reduction or the like), the original thumbnail image data 98 in the extension property set 22 is processed by applying any viewing parameters 20 contained in the FlashPix file (or any advanced edits 100 contained in the extension property set 22) and comparing the result with the standard thumbnail image 23 in the same file. If the two images are different, this indicates that the original image data has been modified in an unknown way and that the CFA image data 94 should not be used to make the output print image. In this case, the output print is made using the standard FlashPix image data 24, as in the case where an "older" printer is not aware of the extension data.

Many applications are able to open images stored in "JPEG interchange format" (JIF) files defined by the Baseline DCT (JPEG) version of ISO/IEC 10918-1, which is incorporated herein by reference. This standard allows "application segments" to be included in the JIF bitstream. The data inside an application segment is ignored by applications that are not familiar with the meaning of the data in the application segment. A number of image file formats have been developed which use a single application segment to store ancillary data and a reduced-resolution "thumbnail" image. These image formats include JFIF, defined in "JPEG File Interchange Format Version 1.02 Sep. 1, 1992 C-Cube Microsystems", the JPEG compressed version of Exif (Exchangeable image format) described in "Digital Still Camera Image File Format Proposal (Exif) Version 1.0 Mar. 24, 1995 JEIDA/Electronic Still Camera Working Group" and SPIFF, defined in "ITU-T Rec. T.84, Annex F—Still Picture Interchange File Format, 1995", which are each incorporated herein by reference.

Figure 6:
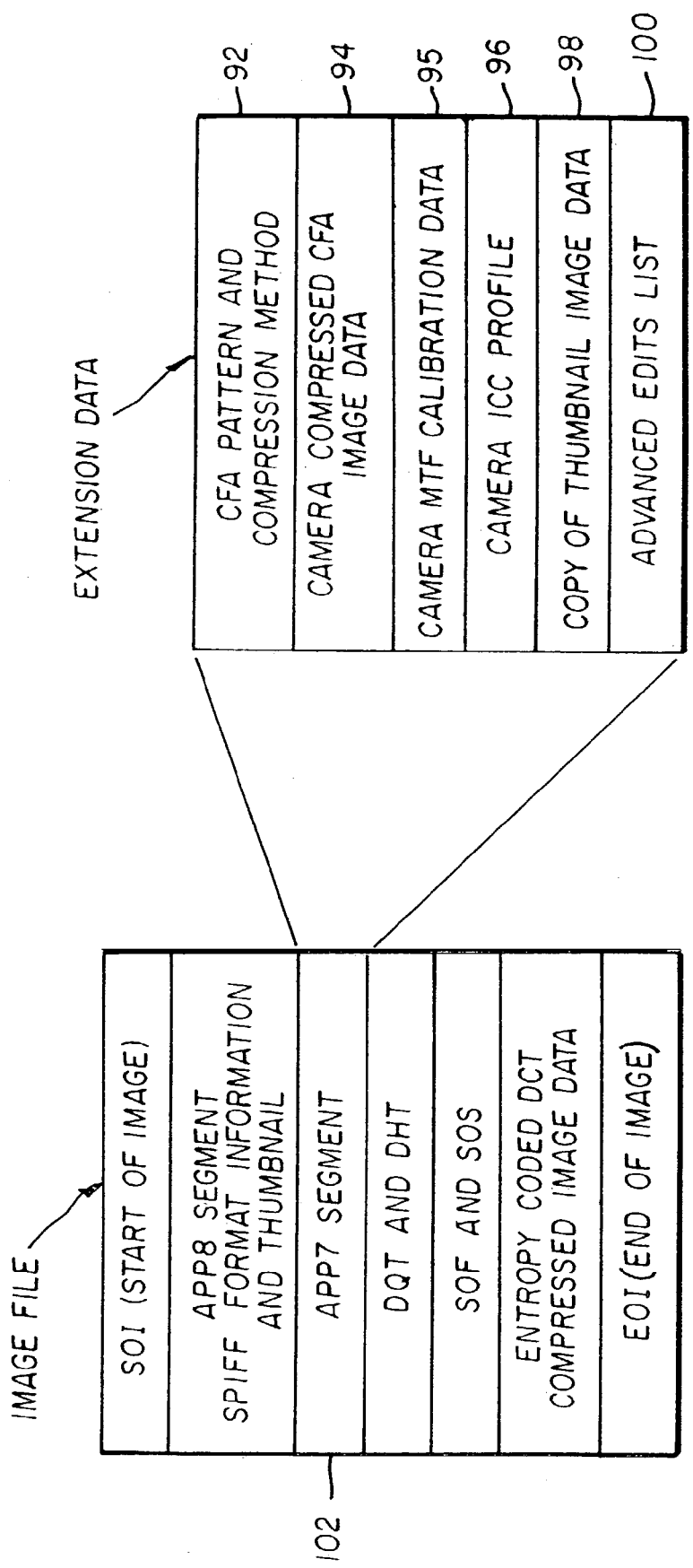
FIG. 6 is an illustration of a JPEG interchange file format incorporating extension data according to the invention.

In a second embodiment shown in FIG. 6, a JPEG interchange format file is used. The file contains a complete JPEG data stream which is valid according to the ISO JPEG standard (ISO/IEC 10918-1). The fields cited in FIG. 6 are identified as follows:

SOI=start of image
APP=application segment
DQT=define quantization tables
DHT=define huffman tables
SOF=start of frame
SOS=start of scan
EOI=end of image More specifically, the JPEG data stream also includes an application segment 102(application segment 7(APP7), in this example) that includes the same type of information as stored in the FlashPix extension property set 22, as described in connection with FIG. 5.

The invention has been described with reference to a preferred embodiment. However, it will be appreciated that variations and modifications can be effected by a person of ordinary skill in the art without departing from the scope of the invention. For instance, while the processing necessary for forming the finished files, e.g., in the FlashPix format, has been described in connection with a computer, it should be clear that all of the processing could be designed into the camera.

PARTS LIST

| | |
|---|---|
| 10 | capture step |
| 12 | connect step |
| 14 | downloading step |
| 16 | processing step |
| 18 | file formatting step |
| 19 | header |
| 20 | viewing parameters |
| 21 | property set data |
| 22 | extension property set data |
| 23 | thumbnail image data |
| 24 | complete image data |
| 25 | lower resolution image data |
| 26 | discard step |
| 27 | editing step |
| 28 | application step |
| 30 | camera |
| 32 | host computer |
| 34 | optical section |
| 36 | image sensor |
| 38 | lens |
| 40 | shutter-aperture device |
| 42 | clock generator and driver circuit |
| 44 | ASP and A/D section |
| 46 | DSP |
| 48 | output interface |
| 50 | removable memory |
| 52 | interface driver |
| 54 | control processor |
| 56 | card reader |
| 58 | display |
| 60 | hard copy printer |
| 62 | algorithm section |
| 64 | direct pixel mapping/cropping |
| 66 | CFA interpolation |
| 67 | user interface |
| 70 | transmission link |
| 72 | remote computer |
| 74 | remote output device |
| 80 | file format extension step |
| 82 | editing step |
| 84 | printing step |
| 86 | local linkage |
| 88 | remote linkage |
| 90 | separation step |
| 92 | CFA pattern and compression method data |
| 94 | CFA image data |
| 95 | camera MTF calibration data |
| 96 | camera ICC profile |

PARTS LIST-continued

| | |
|---|---|
| 98 | thumbnail image data |
| 100 | advanced edits list |
| 102 | application segment |

What is claimed is:

1. A method of capturing color images in a digital camera and transmitting the images to a remote output device for printing, comprising the steps of:
   a) providing a digital camera having an image sensor including an array of discrete light sensitive pixels overlaid with a color filter array (CFA) pattern;
   b) using the digital camera to capture an image and to produce color image data corresponding to the CFA pattern;
   c) converting the color image data corresponding to the CFA pattern in an analog-to-digital converter to produce digital CFA image data;
   d) compressing the digital CFA image data to produce compressed CFA image data;
   e) producing an image file containing both the compressed CFA image data and processed RGB image data; and
   f) transferring the compressed CFA image data and not the processed RGB image data to a remote computer through a transmission link.

2. The method of claim 1 wherein the transmission link is the Internet.

3. The method of claim 1 wherein the image file is stored on a removable memory card.

4. The method of claim 1 further including the steps of:
   g) decompressing and processing the compressed CFA image data using the remote computer to produce final image data; and
   h) printing the final image data using a printer connected to the remote computer.

5. The method of claim 4 wherein the transmission link is the Internet.

6. The method of claim 5 wherein the image file further includes an ICC color profile.

7. The method of claim 5 wherein the image file is stored on a removable memory card.

* * * * *